United States Patent [19]

Robinson

[11] Patent Number: 5,113,753
[45] Date of Patent: May 19, 1992

[54] APPARATUS FOR AUTOMATIC APPLICATION OF CONDIMENTS TO A SANDWICH

[75] Inventor: Hugh Robinson, Wenham, Mass.

[73] Assignee: Design Technology Corporation, Billerica, Mass.

[21] Appl. No.: 509,312

[22] Filed: Apr. 13, 1990

Related U.S. Application Data

[63] Continuation-in-part of Ser. No. 66,733, Jun. 23, 1987, abandoned.

[51] Int. Cl.⁵ .................... A21C 9/04; B32B 31/04
[52] U.S. Cl. ........................ 99/326; 99/355; 99/357; 99/443 C; 99/450.4
[58] Field of Search ............... 99/450.1, 450.4, 450.5, 99/450.6, 357, 387, 386, 400, 443 C, 494; 222/410

[56] References Cited

U.S. PATENT DOCUMENTS

| | | | |
|---|---|---|---|
| 1,270,849 | 7/1918 | Lundstrom | 222/410 |
| 2,016,233 | 10/1935 | Herman | 99/450.5 |
| 2,305,203 | 12/1942 | Smith | 222/410 |
| 3,183,856 | 5/1965 | Jolly | 99/355 |
| 3,266,442 | 8/1966 | Udall et al. | 99/450.4 |
| 3,364,878 | 1/1968 | Kobori et al. | 99/450.4 |
| 3,662,677 | 5/1972 | Westling | 99/450.1 |
| 3,945,537 | 3/1976 | Langen | 222/410 |
| 4,202,260 | 5/1980 | Weger | 99/450.4 |
| 4,685,387 | 8/1987 | Hanson et al. | 99/450.1 |
| 4,944,218 | 7/1980 | Cresson | 99/357 |

Primary Examiner—Timothy F. Simone
Attorney, Agent, or Firm—E. T. Barrett

[57] ABSTRACT

An automatic sandwich preparation system in which each sandwich is prepared under the control of a computer with condiments as ordered. Shredded lettuce is delivered by an automatic volume measuring mechanism or by a weight responsive delivery system. Condiments such as mayonnaise and mustard are delivered by a volumetric pump and a flexible spreader blade that rotates over a screen above the surface of the bun. In an alternative arrangement, radial dispensing orifices rotate over the bun followed by a flexible spreader blade. In another alternative, the condiments are fed individually through flexible tubes to the bun surface while the positions of each of the delivery orifices are controlled by a common mechanism.

6 Claims, 7 Drawing Sheets

APPARATUS FOR AUTOMATIC APPLICATION OF CONDIMENTS TO A SANDWICH

REFERENCE TO RELATED APPLICATION

This application is a continuation-in-part of co-pending application Ser. No. 07/066,733 filed Jun. 23, 1987, now abnd. and assigned to the same assignee as the present application.

BACKGROUND OF THE INVENTION

This invention relates to the rapid and automatic preparation of sandwiches in a system that stores and applies condiments to the sandwich.

BRIEF DESCRIPTION OF THE RELATED ART

In the so-called fast-food industry, the profitability of a food outlet is highly dependent upon the speed with which the food can be delivered and the cost of labor in preparing and packaging the food. There are other factors that can enhance the sales, but these must be done in a manner efficient enough to maintain the necessary profitability. It has been the more usual practice to standardize the food preparation and thereby simplify and lower the cost of preparation. For example, a hamburger outlet may prepare all hamburgers in the same way and spread each hamburger with the same kind of condiments. Such standardization has been adopted in many instances because of the higher costs of custom preparation. Individual devices have been provided for automatic operation of certain steps in the preparation of hamburgers on rolls, but these have not been combined in an automatic system that permits wide customer choices without slowing the operation or increasing the costs of preparation.

SUMMARY OF THE INVENTION

The present invention is applicable in various respects to different sandwich combinations, but is described as embodied in an automatic hamburger outlet system in which a sales person enters an order on one of several registers and a custom cooked-to-order sandwich is delivered automatically to a collection area. Each sandwich patty is automatically topped with the particular condiments selected by the customer.

The system makes advantageous use of labor by permitting necessary tasks to be performed in advance during slack periods. For example, the morning period prior to the noon rush may be used to fill the condiment storage containers. The system can then operate for one and one-half hours during the noon rush without further attention other than by an attendant to insure proper operation of the system. The various advantages will be apparent from consideration of the more detailed description of the specific embodiments of the invention.

DESCRIPTION OF THE PREFERRED EMBODIMENTS

Figure 1:
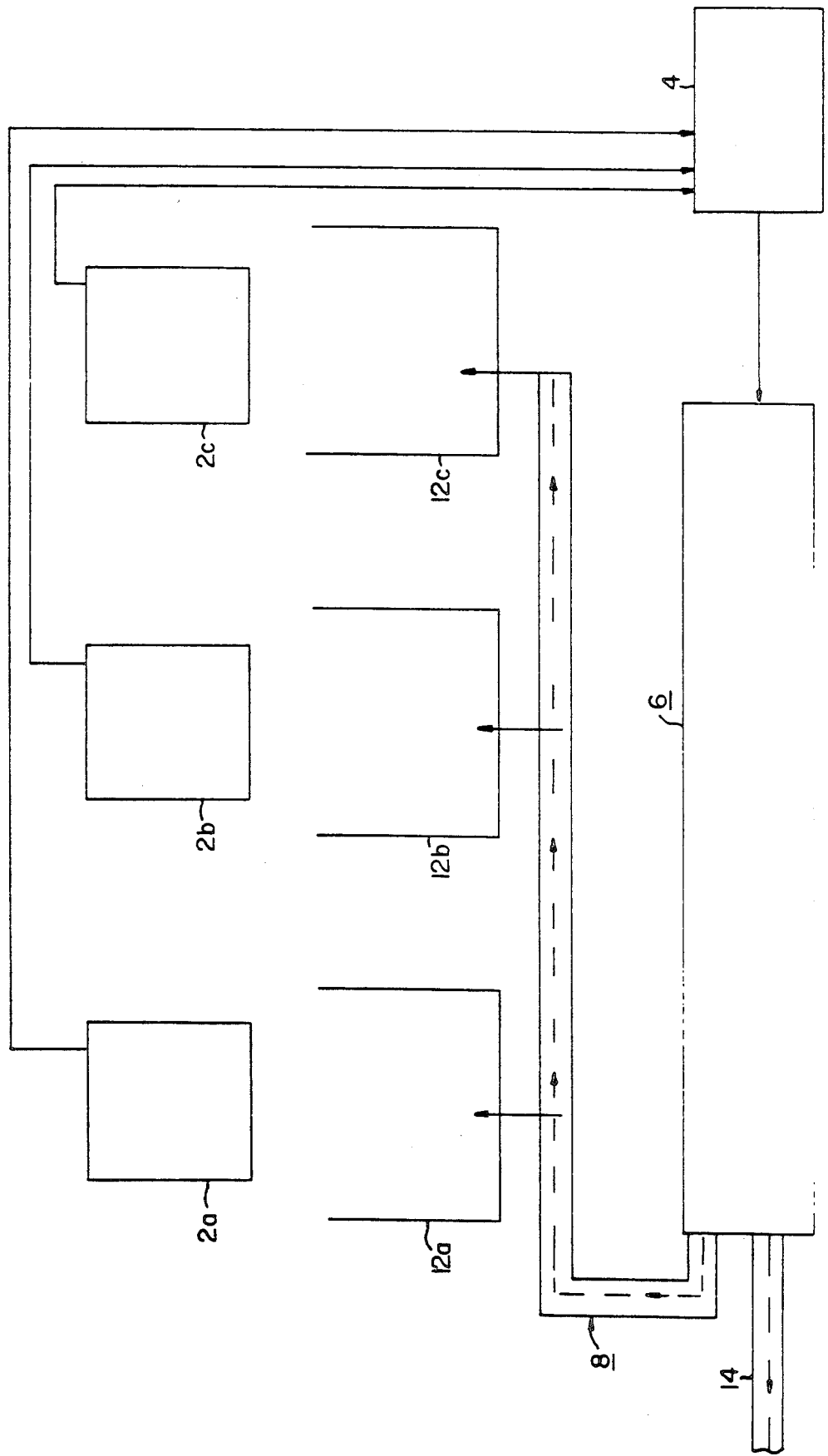
FIG. 1 is a diagrammatic view of an automated hamburger preparation and delivery system embodying the invention.

FIG. 1 illustrates diagrammatically the overall operation of the system. Orders are entered by the sales persons at the registers 2a, 2b and 2c. Each time an order is entered, the sales person specifies the preparation instructions including the particular condiments that are to be placed in the bun. This information, along with the order and station codes, is transmitted to a computer 4 that controls the operation of the hamburger processor and delivery system, generally indicated at 6. A printing mechanism under the control of the computer 4 prints the carton with the particular specifications for degree of doneness, adornments, and station and order codes. The computer causes the crown of a bun to be removed from storage, grilled, placed in the carton, printed with the appropriate information, and moved successively through the stages of the preparation system in which the selected kinds and amounts of condiments are automatically applied to the bun crown. The finished sandwich may be delivered to an area near the register at which the order was placed or it may be delivered to a special area where an entire order is collected under the control of the computer 4. The computer 4 may be a conventional design using a conventional program arranged for this particular application. Such computers and programs are well known in that field.

At the same time the bun crown is removed from storage, the computer starts a hamburger patty through the broiler and cooks it to the specified degree of doneness. The "upside down" preparation of the bun saves processing time because it permits the condiments to be added to the bun during the time the hamburger is being cooked. When the particular crown reaches the broiler station, the meat patty is placed on the crown which continues along the conveyor system to receive other ingredients, such as cheese, lettuce, catchup etc. While the meat patty is broiling, the computer also removes a bottom portion of the roll from storage, preheats it in a microwave region, and toasts it, and when the patty and crown arrive at this station, the bottom bun portion is placed on top of the assembly. The carton is then closed automatically and placed on a conveyor, generally indicated at 8. The conveyor 8 returns the carton to a collection bin 12a, 12b or 12c near the particular register where the order was placed. If the order was placed from a drive-in window, a conveyor belt, generally indicated at 14, receives the carton and transports it to the drive-in window area.

Figure 2:
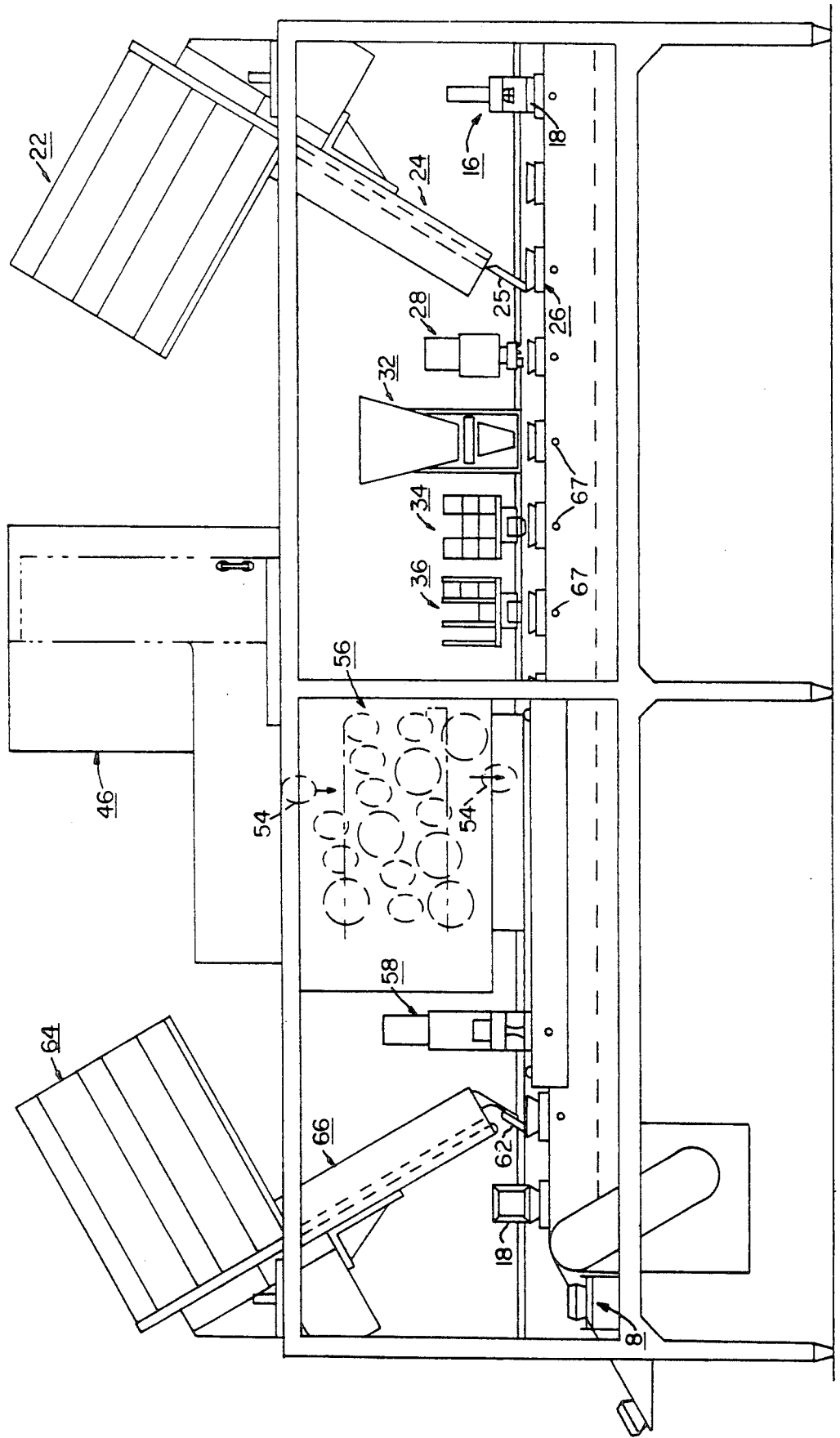
FIG. 2 is a front view of the food preparation and storage portion of FIG. 1.
Figure 3:
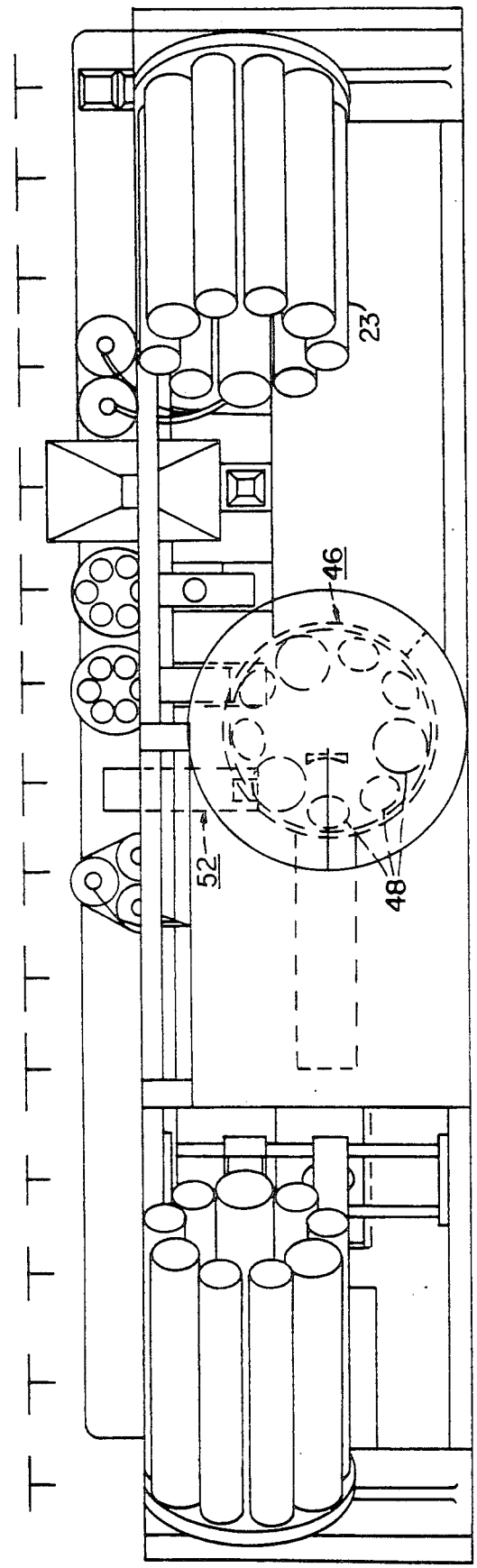
FIG. 3 is a top view of the system shown in FIG. 2.
Figure 4:
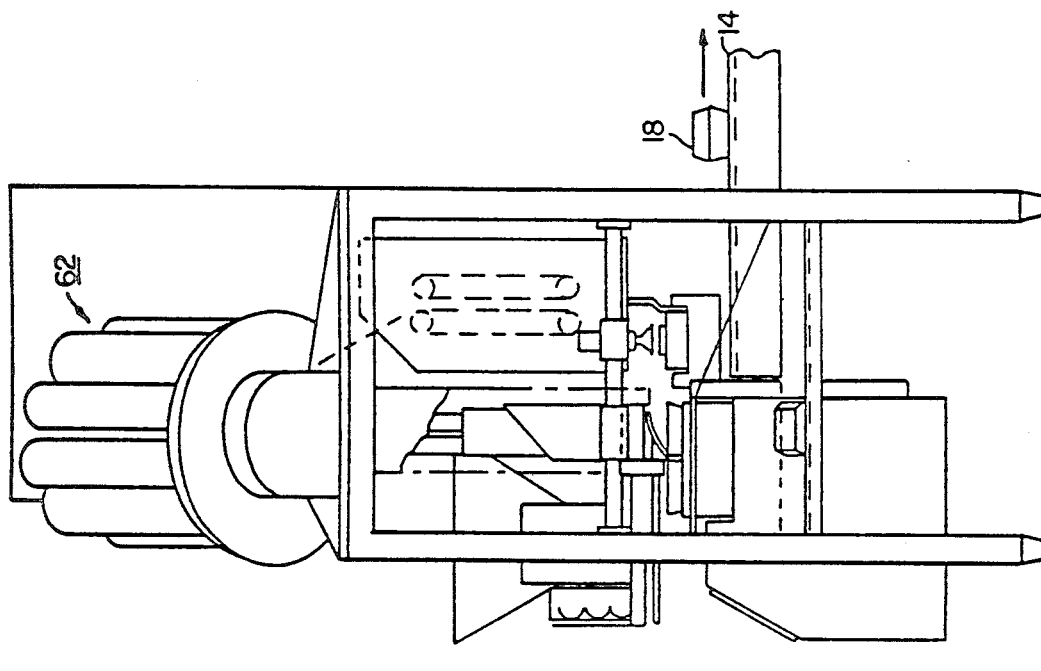
FIG. 4 is an end view of the system of FIG. 2.

The basic elements of the preparation system are shown by FIGS. 2, 3 and 4. When an order is received by the computer, a printing mechanism, diagrammatically illustrated at 16 in FIG. 2, prints the appropriate information on a carton 18 which may be of conventional construction, for example formed of insulating material with a folding lid. Simultaneously, a bun crown 25 is delivered from a "Lazy Susan" storage magazine, generally indicated at 22, to a grill, generally indicated at 24. The printed carton is transported by an indexing conveyor, generally indicated at 26, to a position at the output of the grill 24 where the crown 25 of the bun is placed, toasted side up, in the carton 18. At the next conveyor station, the cut side of the crown is coated with a specified condiment, such as mustard or mayonnaise or a mixture of condiments, by an application 28. At the next station, chopped lettuce is added to the bun by a dispenser 32 unless the initial order specified that lettuce be omitted. The conveyor belt then advances one step to position the bun to receive tomato if called for in the order. A tomato slicer and dispenser 34 is loaded with tomatoes from which the end portions have previously been removed. The tomato may be delivered as two side-by-side or over-lapping slices or as one slice centered on the bun crown depending upon order preference.

At the next station, an onion slicer and dispenser 36 delivers one or more slices of onion, if called for in the original order. The dispenser 36 stores a quantity of onions, which have been peeled and the end portions removed, in a number of rotatable magazines. If called for in the order, a bacon dispenser 52 (FIG. 3) places one or more strips of bacon on the crown.

The frozen meat patties are stored in a freezer 46 which contains a series of tubular magazines 48 (FIG. 3), arranged in a circle, which may be of different diameters to accommodate different sizes of patties. The magazines are rotated until a hamburger of the appropriate size is positioned at an exit window at the bottom of the stack of patties.

A cheese dispenser slices cheese from the bulk. The meat patty (or patties) and one or more slices of cheese are loaded onto the crown by a patty/cheese loader 58 (FIG. 2). A frozen meat patty 54 is fed into the broiler and the crown 25 is placed in the toaster grill 24 so that both arrive at the same time at the patty/cheese loader 58.

The degree of cooking is automatically adjusted by the computer 4 to provide the specified degree of doneness. Mechanisms for accomplishing this are described in more detail in the above-referenced patent application Ser. No. 07/066,733.

When the patty 54 arrives at the patty-cheese loader 58, the toasted bottom portion of the bun is placed on top of the patty. The carton 18 is then closed and the carton inverted onto the delivery conveyor 8 to be carried to the area of the register where the original order was placed. Each station is provided with an indicator light, as shown at 67 in FIG. 2, indicating that the particular condiment should be fed to that particular sandwich so that in the event of a malfunction, the condiment may be loaded manually. The operator can then replenish the supplies or manually supplement the operation of the processor as indicated by a separate set of lights on a main control panel (not shown).

Figure 5:
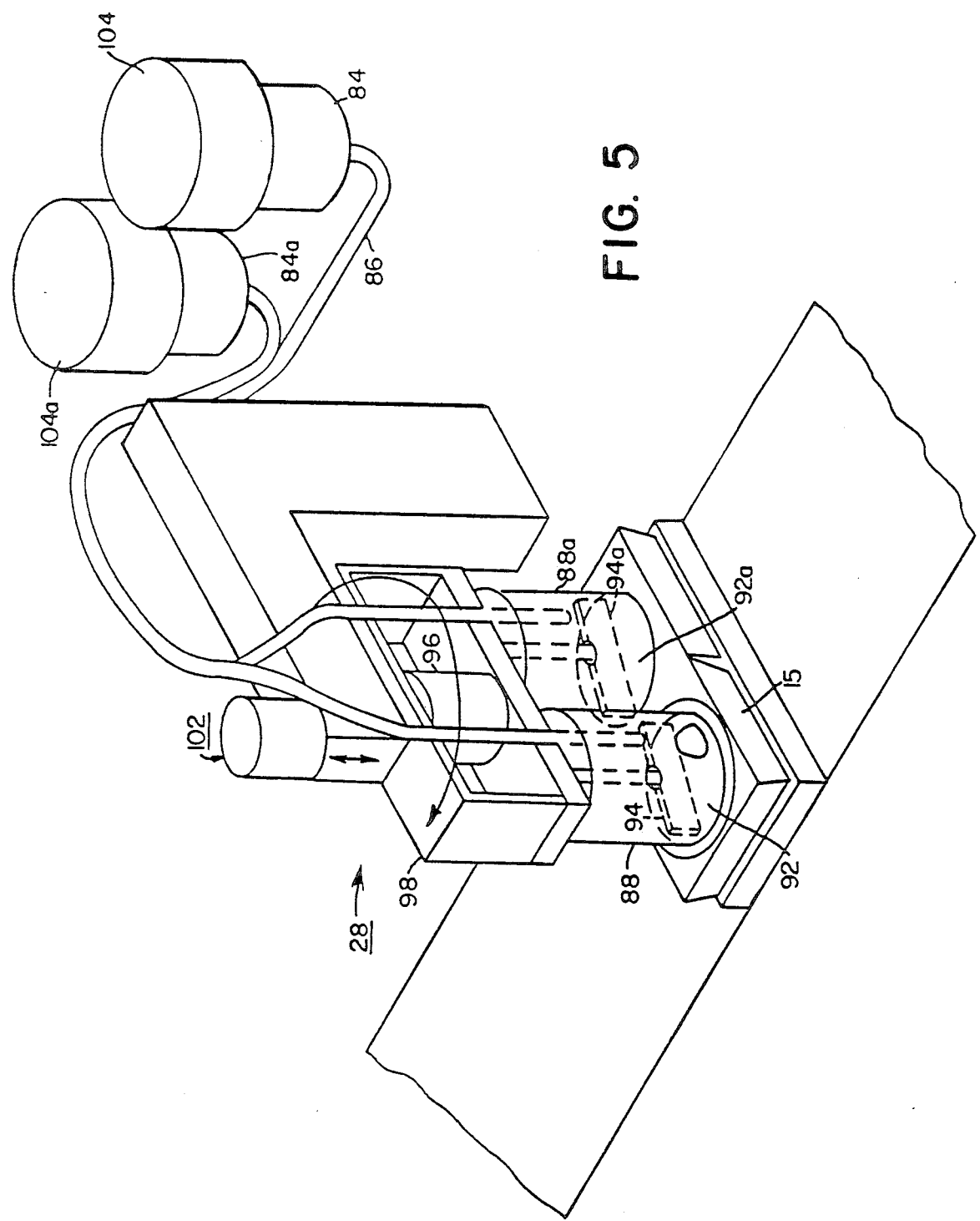
FIG. 5 shows an automatic system for dispensing and spreading selected condiments onto a hamburger roll.
Figure 6:
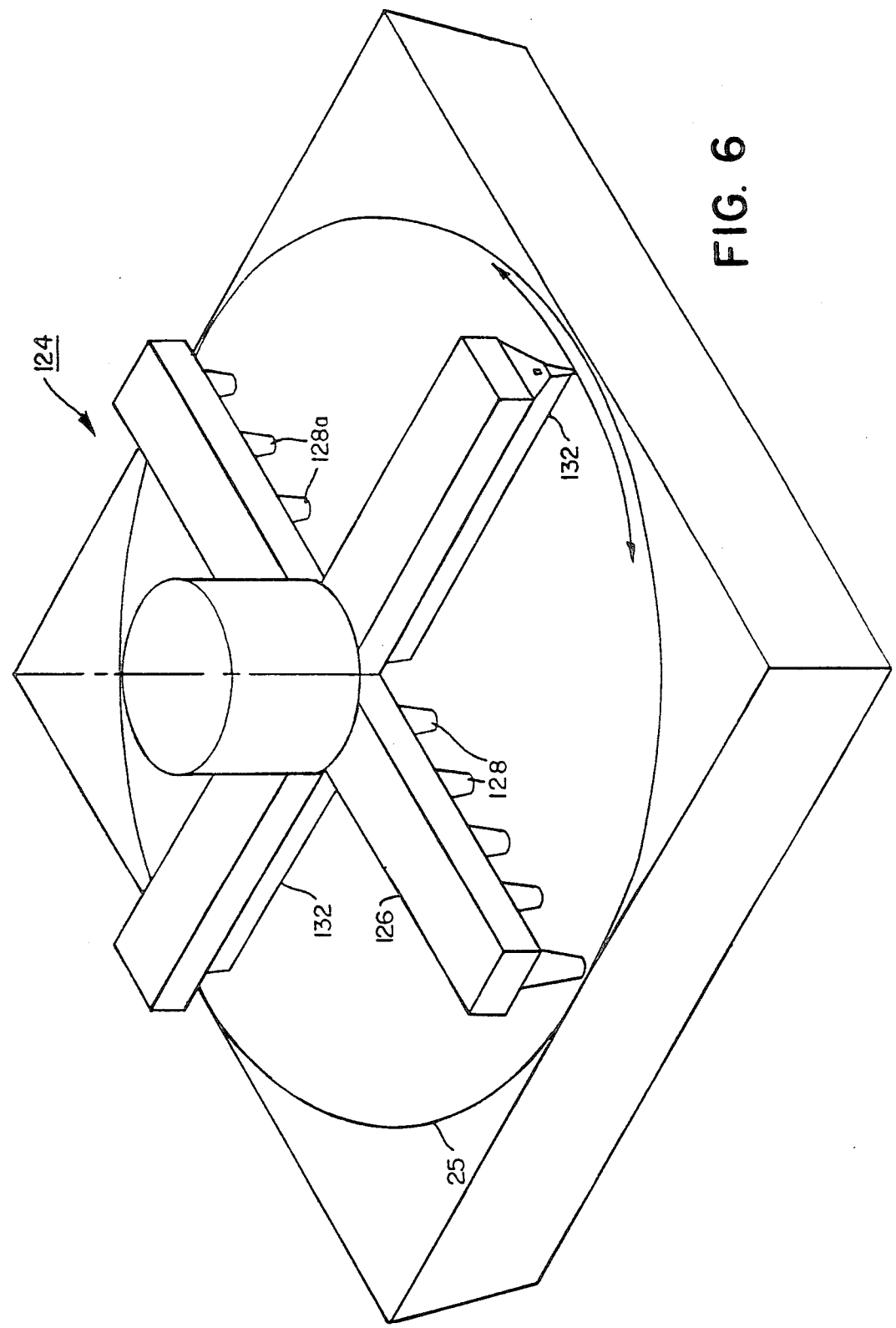
FIG. 6 shows an alternate arrangement for dispensing and distributing selected condiments.

A condiment dispenser 28 suitable for use in the processor assembly is shown in FIG. 5. A positive displacement pump 84 contains a supply of a particular condiment, say mustard, and is connected by a hose 86 to the interior of a plastic container 88. The bottom of the container 88 is formed by a screen 92, which in operation is positioned directly over the cut side of the bun crown. A flexible wiper 94 is positioned on the screen 92 and is arranged to be rotated by a motor 96.

A second container 88a is provided for a second condiment, say mayonnaise, and is provided with similar attachments indicated by the same numbers followed by the suffix "a". The containers and the wiper assemblies are supported by a rotatable turret 98. The entire turret assembly is arranged to be rotated one-half turn in either direction and to be moved vertically by a motor drive assembly indicated diagrammatically at 102. The hamburger order may specify which of the condiments is to be used and whether the amount is to be "heavy" or "light".

In operation, assume mustard is to be applied to the crown. The turret assembly 98 is then lowered so that the screen 92 engages the bun surface. A stepping motor 104 is activated by the computer and drives the positive displacement pump 84 to deliver the required quantity of mustard to the interior of the container 88 and the wiper blade 94 rotates to press the mustard through the screen 92 onto the bun surface. The turret assembly 98 is then lifted to remove the screen 92 from the bun.

If the requested spread is mayonnaise, the turret assembly 98 is rotated one-half turn to bring the container 88a in position over the bun. The bridge assembly 98 is then lowered. A stepping motor 104a is then activated to operate a positive displacement pump 84a that pumps mayonnaise, in the specified quantity, into the container 88a and the wiper 94a is rotated to spread the mayonnaise o the bun.

Figure 7:
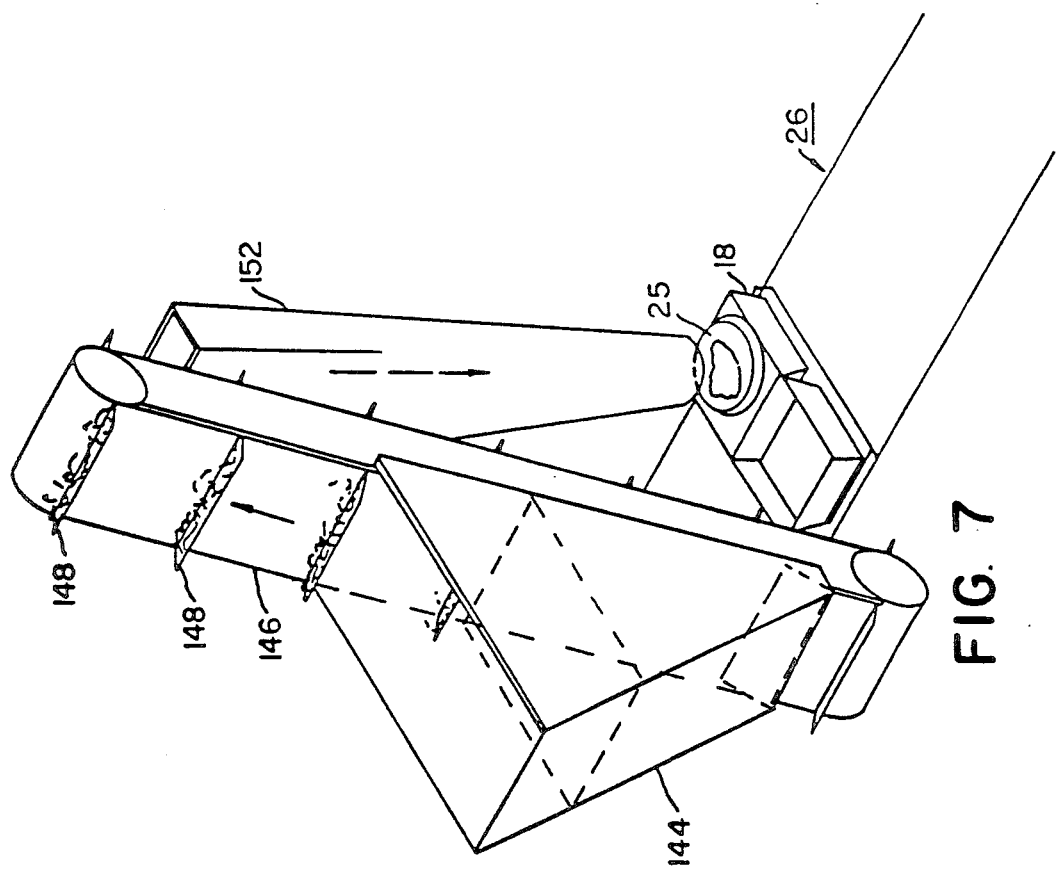
FIG. 7 illustrates a dispenser for chopped onion or lettuce making use of a bucket conveyor.

FIG. 7 illustrates still another mechanism for spreading the condiments on a roll. A rotatable carriage which also operates vertically, generally indicated at 124, is provided with four arms extending from a central supporting axle (not shown). One arm 126 contains a number of downwardly extending spaced nozzles 128 that are connected by hoses (not shown) to a positive displacement pump and reservoir as described in connection with FIG. 9. These nozzles 128 deliver mayonnaise to the bun crown 25 while a spreader knife 132 distributes the mayonnaise evenly over the bun surface.

In operation, the carriage 124 lowers to the bun surface and rotates one and one-quarter turns while the mayonnaise is being delivered through the nozzles 128 to the bun surface during one revolution of the carriage 124. The rotation is then stopped and the carriage is raised to return to its original position.

If mustard is called for, the carriage 124 is lowered and a similar pump arrangement delivers the desired quantity of mustard to a second set of nozzles 128a while the carriage 124 is being rotated one full turn in the opposite direction. The supply of mustard is then ended and the carriage raised to its original position.

Another arrangement for dispensing chopped lettuce or other vegetable is shown in FIG. 7. The chopped vegetable is contained in a triangular shaped supply hopper 144 one wall of which is formed by an endless bucket conveyor 146. A series of spaced buckets or projections 148 are dimensioned to transport one serving of the chopped vegetable. In operation, the conveyor is moved one increment to bring one of the buckets 148 over the top of the conveyor support and dump the vegetable into a guide chute 152 that is large enough at its upper end to receive the entire load from the bucket. The guide chute 152 gradually changes shape in a smooth curve downwardly until the bottom end is circular and of appropriate size to distribute the chopped vegetable on the crown surface which is then positioned directly beneath the chute opening.

Figure 8:
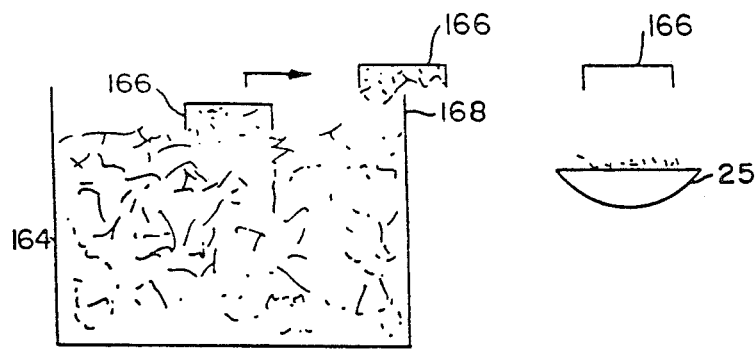
FIG. 8 shows a dispenser for chopped vegetables in which the vegetables are held in an inverted vacuum cup, the excess sheared off, and the measured amount delivered to the hamburger bun.

FIG. 8 illustrates yet another apparatus for dispensing the chopped vegetable. The chopped lettuce or other vegetable is stored in a supply bin 164. A vacuum cup 166 having a porous bottom is connected to a vacuum pump (not shown) to produce a continuous flow of air through the cup 166 and out through the bottom of the cup. This inverted cup is lowered into the supply bin where the air current causes it to be filled with the chopped vegetable. The cup 166 is then moved across the surface of a doctor blade 168, which may be one edge of the supply bin 164, to remove the excess chopped vegetable. The cup 166 is then positioned over the bun crown 25 and the vacuum pump disabled to release the vegetable onto the crown. A standard type pick and place mechanism can be used to provide the necessary motion. Instead of a vacuum cup, a claw type pick up can be used, but has the material disadvantage that precise control of the incremental quantities is more difficult.

Figure 9:
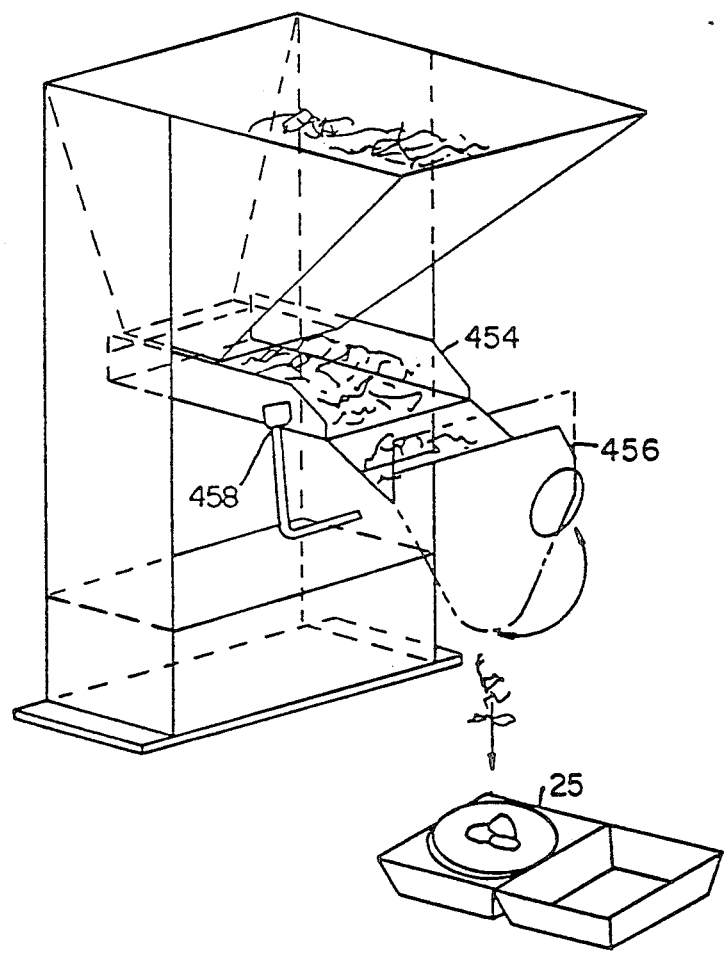
FIG. 9 shows an arrangement for storing and dispensing a predetermined weight of a shredded product such as lettuce.

Another system for measuring and dispensing a shredded food product, such as lettuce, is shown in FIG. 9. The shredded lettuce is contained in a hopper, generally indicated at 452, which feeds into a vibratory feeder 454. The vibratory feeder drops the shredded lettuce into a pivoted funnel 456 that is balanced by a counter weight 458. When the weight of the lettuce in the funnel 456 equals the desired portion, the counter weight 458 is overbalanced and the funnel 456 tips forwardly to empty its contents on the bun crown 25.

Sanitation is an important element in food processing and serving. The systems described here have the marked advantage that the hamburger sandwiches can be prepared, custom cooked, and provided with selected condiments without contact with human hands at any point.

I claim:

1. A sandwich processing system for assembling and delivering bread, condiments and meat products comprising
    conveyor means having a plurality of stations,
    a supply of bread having first and second portions,
    first storage means for storing a supply of of said first portions of said bread,
    second storage means for storing a supply of said second portions of said bread,
    means for dispensing said first portions of said bread onto said conveyor means.
    condiment dispensing means for storing and dispensing a condiment onto said first portion of said bread at a predetermined station of said conveyor including
        a storage chamber for said condiment.
        a receptacle having a porous bottom.
        pump means for transferring a predetermined amount of said condiment from said storage chamber to said receptacle, and
        means for spreading and forcing said condiment through said porous bottom onto said first portion of said bread, and
    means for storing, cooking and dispensing meat products onto said first portion of said bread.

2. The sandwich processing and delivery system as claimed in claim 1 including
    a second storage chamber for a second condiment,
    a second receptacle having a porous bottom,
    second pump means for transferring a predetermined amount of said second condiment to said second receptacle,
    means for moving said second receptacle to place it over said first portion of said bread at said predetermined station, and
    means for spreading and forcing said second condiment through said porous bottom and onto said first portion of said bread.

3. The sandwich processing and delivery system as claimed in claim 2 including
    rotatable turret means supporting both of said receptacles for selectively placing one of said receptacles over said first portion of said bread.

4. The sandwich processing and delivery system as claimed in claim 2 wherein
    said means for spreading and forcing said condiment through said porous surface includes a flexible wiper blade.

5. The sandwich processing and delivery system as claimed in claim 1 wherein
    said porous bottom is a screen.

6. The sandwich processing and delivery system as claimed in claim 1 wherein
    said pump means includes a stepping motor.

* * * * *